Patented Aug. 20, 1935

2,011,582

UNITED STATES PATENT OFFICE 2,011,582

PARAMETHYL PARAHYDROXY DIPHENYL SULPHIDE AND METHOD OF PREPARING THE SAME

Treat B. Johnson, Bethany, Conn., assignor to Sharp & Dohme, Incorporated, Philadelphia, Pa., a corporation of Maryland No Drawing. Original application March 10, 1928, Serial No. 260,817. Divided and this application January 12, 1934, Serial No. 706,408

2 Claims. (Cl. 260—150)

This invention relates to a new derivative of hydroxydiphenyl sulphide, namely, the paramethyl parahydroxy diphenyl sulphide, and to a process of preparing the same.

This application is a division of my prior application Serial No. 260,817, now Patent No. 1,976,732 of October 16, 1934.

The production of the new compound is illustrated by the following example, the parts being by weight.

*Example.*—50 parts of para-anisidine (1.25 mols.) are dissolved in 85 parts of concentrated hydrochloric acid (2.5 mols.) and the solution diluted with water. The amine is then diazotized as usual. 53 parts of sodium para thiocresolate (1 mol.) are dissolved in 100 parts of water containing 13 parts of sodium hydroxide and the solution heated to 70° C. The prepared diazo solution is slowly added to this heated solution, with agitation to insure intimate contact and uniform distribution and reaction. Under these conditions coupling takes place with decomposition of the intermediate diazo-thio-ether and formation of parametyl parametoxy diphenyl sulphide,

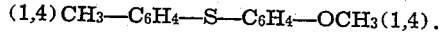

(1,4) $CH_3$—$C_6H_4$—S—$C_6H_4$—$OCH_3$ (1,4).

This was obtained as a colorless crystalline compound melting at 45–46° and boiling at 181–184° C. at 4 mm.

Dealkylation: The parametyl parametoxy diphenyl sulphide is then subjected to dealkylation by heating, for example, with hydrobromic acid in glacial acetic acid solution at a temperature of about 80 to 90° C. for a sufficient period of time, e. g., about eight hours, using about 1 to 2 mols of hydrobromic acid for each mole of the parametyl parametoxy diphenyl sulphide. Excess of hydrobromic acid and acetic acid is then driven off and sodium hydroxide solution added. The alkaline solution is then heated at steam bath temperature to hydrolyze any acetylated product formed during the dealkylation process and finally extracted with ether to remove any of the unaltered alkylated product. The alkaline solution is then acidified and the liberated phenol extracted with ether. The ether extract is dried, e. g., with calcium chloride, the ether distilled off, and the parametyl parahydroxy diphenyl sulphide is then fractionally distilled under diminished pressure. The boiling point of parametyl parahydroxy diphenyl sulphide is 178–180° at 3 mm. The compound melts at 67–68° C.

The new parametyl parahydroxy diphenyl sulphide has valuable germicidal properties and can be readily produced in a state of high purity such that its germicidal properties can be taken advantage of for antiseptic and other purposes.

I claim:

1. The method of producing parametyl-parahydroxy-diphenyl sulphide which comprises diazotizing para-anisidine and coupling the diazonium compound with para thio-cresol, decomposing the intermediate diazo-thio-ether to form parametyl-parametoxy-diphenyl sulphide and de-etherifying the same to produce the parametyl-parahydroxy-diphenyl sulphide.

2. As a new product, the parametyl-parahydroxy-diphenyl sulphide boiling at about 178–180° at 3 mm. and melting at about 67–68° C.

TREAT B. JOHNSON.